(12) United States Patent
Xiao et al.

(10) Patent No.: US 10,973,045 B2
(45) Date of Patent: Apr. 6, 2021

(54) SEMI-PERSISTENT TRANSMISSION METHOD AND APPARATUS IN V1X COMMUNICATION

(71) Applicant: HUAWEI TECHNOLOGIES CO., LTD., Shenzhen (CN)

(72) Inventors: Xiao Xiao, Beijing (CN); Zhenzhen Cao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/273,670

(22) Filed: Feb. 12, 2019

(65) Prior Publication Data
US 2019/0174522 A1    Jun. 6, 2019

Related U.S. Application Data

(63) Continuation of application No. PCT/CN2016/094943, filed on Aug. 12, 2016.

(51) Int. Cl.
*H04W 72/12* (2009.01)
*H04W 72/04* (2009.01)
(Continued)

(52) U.S. Cl.
CPC ......... *H04W 72/1278* (2013.01); *H04W 8/24* (2013.01); *H04W 28/0215* (2013.01);
(Continued)

(58) Field of Classification Search
CPC ............... H04W 72/1278; H04W 8/24; H04W 28/0215; H04W 28/18; H04W 72/04;
(Continued)

(56) References Cited

U.S. PATENT DOCUMENTS

2012/0069805 A1 *   3/2012   Feuersanger ..... H04W 72/1236
                                                          370/329
2013/0039320 A1     2/2013   Arima
(Continued)

FOREIGN PATENT DOCUMENTS

CN        101765211 A      6/2010
CN        102056174 A      5/2011
(Continued)

OTHER PUBLICATIONS

International Search Report dated May 4, 2017 in corresponding International Application No. PCT/CN2016/094943.
(Continued)

*Primary Examiner* — Ian N Moore
*Assistant Examiner* — Sun Jong Kim
(74) *Attorney, Agent, or Firm* — Leydig, Voit & Mayer, Ltd.

(57) ABSTRACT

Semi-persistent transmission method and apparatus are provided. The semi-persistent transmission method includes: obtaining, by user equipment UE, a semi-persistent transmission resource; determining, by the UE, a logical channel having a correspondence with the semi-persistent transmission resource; and transmitting, by the UE on the semi-persistent transmission resource, data in the logical channel having the correspondence with the semi-persistent transmission resource. The semi-persistent transmission method and apparatus can support scheduled transmission of various semi-persistent service data.

11 Claims, 6 Drawing Sheets

(51) Int. Cl.
*H04W 8/24* (2009.01)
*H04W 28/02* (2009.01)
*H04W 28/18* (2009.01)

(52) U.S. Cl.
CPC .......... *H04W 28/18* (2013.01); *H04W 72/04* (2013.01); *H04W 72/0453* (2013.01); *H04W 72/1205* (2013.01)

(58) Field of Classification Search
CPC ........ H04W 72/0453; H04W 72/1205; H04W 72/1284; H04W 72/1289; H04W 72/1294; H04W 72/14; H04W 8/245; H04W 4/70; H04W 72/048; H04W 72/042; G08G 1/00
See application file for complete search history.

(56) References Cited

U.S. PATENT DOCUMENTS

| | | |
|---|---|---|
| 2013/0294247 A1 | 11/2013 | Zhu et al. |
| 2014/0023008 A1 | 1/2014 | Ahn et al. |
| 2015/0341858 A1* | 11/2015 | Hwang ................. H04L 1/1854 370/311 |
| 2017/0019887 A1* | 1/2017 | Jiang ................... H04W 72/042 |
| 2018/0049224 A1* | 2/2018 | Dinan ................ H04W 72/1263 |
| 2018/0192427 A1* | 7/2018 | Wang .................... H04W 72/12 |

FOREIGN PATENT DOCUMENTS

| | | |
|---|---|---|
| CN | 102104959 A | 6/2011 |
| EP | 2343946 A2 | 7/2011 |
| EP | 2942993 A1 | 11/2015 |
| EP | 3101969 A1 | 12/2016 |
| WO | 2015113398 A1 | 8/2015 |

OTHER PUBLICATIONS

OPPO, "Discussion on SPS Enhancements for V2X" 3GPP TSG-RAN2 Meeting #94 R2-163406, Nanjing, P. R. China, Apr. 23-27, 2016, total 3 pages.

3GPP TS 36.331 V13.2.0 (Jun. 2016) "3rd Generation Partnership Project; Technical Specification Group Radio Access Network; Evolved Universal Terrestrial Radio Access (E-UTRA); Radio Resource Control (RRC); Protocol specification" (Release 13), total 623 pages.

ZTE, "SPS enhancements for V2X over Uu" 3GPP TSG RAN WG2 #94 R2-163840, Nanjing, China, May 23-27, 2016, total 4 pages.

3GPP TS 36.321 V13.2.0 (Jun. 2016); "3rd Generation Partnership Project; Technical Specification Group Radio Access Network; Evolved Universal Terrestrial Radio Access (E-UTRA); Medium Access Control (MAC) protocol specification" (Release 13), total 91 pages.

Qualcomm Incorporated, "SPS for V2V Communication" 3GPP TSG-RAN WG2 Meeting #94 R2-164063, Nanjing, China, May 23-27, 2016, total 4 pages.

Ericsson, "SPS Enhancements for Uu Operations in V2X" 3GPP TSG-RAN WG2 #94 Tdoc R2-164112, Nanjing, P.R. China, May 23-27, 2016, total 6 pages.

Qualcomm Incorporated, "eNodeB signaling for SPS resource allocation" 3GPP TSG-RAN WG1 #85 R1-164421, May 23-27, 2016, Nanjing, China, total 4 pages.

International Search Report dated May 4, 2017 in corresponding International Patent Application No. PCT/CN2016/094943.

Written Opinion of the International Searching Authority dated May 4, 2017 in corresponding International Patent Application No. PCT/CN2016/094943.

* cited by examiner

SEMI-PERSISTENT TRANSMISSION METHOD AND APPARATUS IN V2X COMMUNICATION

CROSS-REFERENCE TO RELATED APPLICATIONS

This application is a continuation of International Application No. PCT/CN2016/094943, filed on Aug. 12, 2016, the disclosure of which is hereby incorporated by reference in its entirety.

TECHNICAL FIELD

This application relates to the field of data transmission technologies, and in particular, to a semi-persistent transmission method and apparatus.

BACKGROUND

V2X communication in a general sense means vehicle-to-vehicle (V2V) communication, vehicle-to-infrastructure (V2I) communication, and vehicle-to-pedestrian (V2P) communication. V2X communication is essentially a communication technology for data transmission and information exchange between vehicles. Because the V2X communication is related to key information of vehicle driving safety, and requires timely and accurate information exchange, a communication requirement for high reliability and a short latency is posed. In addition, as an existing global mainstream wireless communication technology, 3rd Generation Partnership Project (3GPP) Long Term Evolution (LTE) cellular communications have advantages such as a short latency, a large capacity, a high speed, and high reliability. Therefore, consideration may be given to use of an LTE cellular system to support the V2X communication, to achieve good V2X communication performance.

In view of this, the standardization organization 3GPP has started standardization work for LTE-based V2X (LTE-V2X) communication, to effectively support vehicle wireless communication related to road safety based on the LTE cellular communications system and by making full use of advantages of LTE.

In an LTE-V2X based communications system, to reduce scheduling overheads of a physical downlink control channel (PDCCH) that may be brought by the V2X communication, the 3GPP LTE-V2X standard uses a semi-persistent scheduling (SPS) technology to allocate a transmission resource to a vehicle user terminal (UE).

In the LTE-V2X communication, allocating a semi-persistent transmission resource to UE by using the SPS technology includes: allocating, by a base station, an SPS resource to the UE by using a PDCCH. Then the UE can periodically use the allocated SPS resource. Particularly, every moment at which the SPS resource appears in time domain is referred to as an SPS transmission opportunity. At each transmission opportunity, the UE can use a corresponding transmission resource to transmit data.

It may be learned that, in LTE-V2X uplink SPS, the base station needs to indicate uplink SPS scheduling information only at a time, and the UE can periodically transmit uplink data on the allocated SPS resource, thereby reducing uplink scheduling overheads of the base station. Such an existing SPS scheduling method supports transmission of periodic service data having a fixed arrival period, such as Voice over IP (VoIP), and supports only scheduling of one SPS resource. However, in actual V2X communication, there are different message types such as a cooperative awareness message (CAM), a Decentralized Environmental Notification Message (DENM), and a backward set-up message (BSM). Different types of V2X usually have different service arrival periods, and the existing SPS scheduling solution is difficult to support scheduling of various semi-persistent service data.

SUMMARY

Embodiments of the present invention provide a semi-persistent transmission method and apparatus, which can support scheduled transmission of various semi-persistent service data.

According to one aspect, a semi-persistent transmission method is provided, including:

obtaining, by user equipment UE, a semi-persistent transmission resource;

determining, by the UE, a logical channel having a correspondence with the semi-persistent transmission resource; and transmitting, by the UE on the semi-persistent transmission resource, data in the logical channel having the correspondence with the semi-persistent transmission resource.

In this implementation, the semi-persistent transmission resource has the correspondence with the logical channel, and it is ensured that the UE transmits, on the transmission resource, the data in the logical channel corresponding to the transmission resource when performing data transmission, to implement scheduled transmission of various semi-persistent service data and avoid problems such as a transmission failure, a packet loss, and a waste of a semi-persistent transmission resource that are caused by data multiplexing between logical channels and an improper transmission order.

In a possible design, the method further includes: receiving, by the UE, semi-persistent resource configuration information from a network device.

In this implementation, the UE obtains the semi-persistent resource configuration information based on scheduling by the network device, to avoid a collision or interference between transmission resources of a plurality of UEs.

In a possible design, the method further includes: receiving, by the UE, semi-persistent resource configuration information corresponding to the semi-persistent transmission resource from a network device.

In a possible design, the method further includes: sending, by the UE, a terminal capability report to the network device, where the terminal capability report carries indication information indicating whether the UE supports a plurality of parallel semi-persistent scheduling configurations.

In this implementation, the UE notifies, based on the terminal capability report, the network device whether the UE supports a plurality of parallel semi-persistent scheduling configurations, so that the network device makes a decision on whether to perform related configuration of multi-path semi-persistent transmission for the UE.

In a possible design, the method further includes: sending, by the UE, terminal assistance information to the network device, where the terminal assistance information includes service characteristic information of at least one logical channel.

In this implementation, the UE reports a service characteristic of a logical channel of the UE to the network device based on the terminal assistance information, so that the network device makes a decision on a semi-persistent transmission resource allocation policy based on the service characteristic of the logical channel reported by the UE.

In a possible design, the method further includes: receiving, by the UE, an activation message from the network device, where the activation message indicates the semi-persistent transmission resource; and determining, by the UE, the semi-persistent transmission resource based on the activation message.

In this implementation, the UE determines the semi-persistent transmission resource based on the activation message from the network device.

In a possible design, the method further includes: activating, by the UE, a semi-persistent resource configuration based on the activation message, where the semi-persistent resource configuration is determined based on the semi-persistent resource configuration information.

In this implementation, the UE activates the semi-persistent resource configuration based on the activation message from the network device.

In a possible design, the semi-persistent resource configuration activated by the UE based on the activation message corresponds to the semi-persistent transmission resource indicated by the activation message.

In this implementation, the semi-persistent resource configuration activated by the UE corresponds to the semi-persistent transmission resource indicated by the activation message.

In a possible design, in a sidelink communication scenario, the indication information is used to indicate that the UE supports a plurality of sidelink-based semi-persistent scheduling configurations.

In this implementation, the UE notifies, by using specific content indicated by the indication information, the network device that the UE supports a plurality of sidelink-based semi-persistent scheduling configurations.

In a possible design, in a sidelink communication scenario, the service characteristic information is used to indicate a service characteristic of a sidelink-based logical channel.

In a possible design, the service characteristic information includes one parameter or a combination of a plurality of parameters of the following: a logical channel ID (LCID), a layer 2 target address, a data packet arrival period, a data packet arrival moment, a data packet size, and a data packet priority.

In a possible design, the data packet priority is a ProSe Per-Packet Priority.

In a possible design, the semi-persistent resource configuration information includes one parameter or a combination of a plurality of parameters of the following: a semi-persistent configuration identifier, a semi-persistent scheduling interval, a modulation and coding scheme, an LCID, and a layer 2 target address.

In a possible design, the activation message further carries one parameter or a combination of a plurality of parameters of the following: the semi-persistent configuration identifier, the LCID, the layer 2 target address, and a semi-persistent scheduling type indicator.

In a possible design, the activating, by the UE, a semi-persistent resource configuration includes:

activating, by the UE based on the semi-persistent configuration identifier in the activation message, a semi-persistent resource configuration corresponding to semi-persistent resource configuration information that includes a same semi-persistent configuration identifier.

In a possible design, the method further includes:

determining, by the UE, a correspondence between the semi-persistent transmission resource indicated by the activation message and a logical channel determined by the LCID and the layer 2 target address in the activation message; or determining, by the UE, a correspondence between a logical channel determined by the LCID and the layer 2 target address in the activation message, and an activated semi-persistent resource configuration and the semi-persistent transmission resource indicated by the activation message; or determining, by the UE, a correspondence between an activated semi-persistent resource configuration and a logical channel determined by the LCID and the layer 2 target address in the activation message.

In a possible design, in an uplink communication scenario, the indication information is used to indicate that the UE supports a plurality of uplink-based semi-persistent scheduling configurations.

In this implementation, the UE notifies, by using specific content indicated by the indication information, the network device that the UE supports a plurality of uplink-based semi-persistent scheduling configurations.

In a possible design, in an uplink communication scenario, the service characteristic information is used to indicate a service characteristic of an uplink-based logical channel.

In a possible design, the service characteristic information includes one parameter or a combination of a plurality of parameters of the following: an LCID, a data packet arrival period, a data packet arrival moment, and a data packet size.

In a possible design, the semi-persistent resource configuration information includes one parameter or a combination of a plurality of parameters of the following: a semi-persistent configuration identifier, a semi-persistent scheduling interval, and an LCID.

In a possible design, the activation message further carries one parameter or a combination of a plurality of parameters of the following: the semi-persistent configuration identifier, the LCID, and a semi-persistent scheduling type indicator.

In a possible design, the activating, by the UE, a semi-persistent resource configuration includes:

activating, by the UE based on the semi-persistent configuration identifier in the activation message, a semi-persistent resource configuration corresponding to semi-persistent resource configuration information that includes a same semi-persistent configuration identifier.

In a possible design, the method further includes:

determining, by the UE, a correspondence between the semi-persistent transmission resource indicated by the activation message and a logical channel determined by the LCID in the activation message; or determining, by the UE, a correspondence between a logical channel determined by the LCID in the activation message, and an activated semi-persistent resource configuration and the semi-persistent transmission resource indicated by the activation message; or determining, by the UE, a correspondence between an activated semi-persistent resource configuration and a logical channel determined by the LCID in the activation message.

In a possible design, the UE performs data transmission based on the activated semi-persistent resource configuration on a semi-persistent transmission resource corresponding to the activated semi-persistent resource configuration.

In a possible design, a manner of the obtaining, by UE, a semi-persistent transmission resource includes:

selecting, by the UE from a preset transmission resource pool, the semi-persistent transmission resource used for corresponding to the logical channel, where such a correspondence may be considered as a type of binding, that is, the UE selects the semi-persistent transmission resource used for binding to the logical channel.

In this implementation, the UE directly determines, from the preset transmission resource pool, the semi-persistent transmission resource used for corresponding to the logical channel without interaction with the network device, to reduce overheads of interaction with the network device.

In a possible design, the method further includes: determining, by the UE, the logical channel used for corresponding to the selected semi-persistent transmission resource.

In a possible design, the method further includes: determining, by the UE based on service characteristic information of the logical channel, semi-persistent resource configuration information corresponding to the semi-persistent transmission resource.

In a possible design, the semi-persistent resource configuration information includes one parameter or a combination of a plurality of parameters of the following: a semi-persistent scheduling interval, a modulation and coding scheme, an LCID, and a layer 2 target address.

According to a second aspect, a semi-persistent transmission method is provided, including:

when UE determines that there is to-be-transmitted data in a logical channel, obtaining, by the UE, a semi-persistent transmission resource having a correspondence with the logical channel; and transmitting, by the UE on the semi-persistent transmission resource, data in the logical channel having the correspondence with the semi-persistent transmission resource.

In a possible design, the transmitting, by the UE, data in the logical channel having the correspondence with the semi-persistent transmission resource includes:

preferentially allocating, by the UE, a semi-persistent transmission resource to the to-be-transmitted data in the logical channel corresponding to the semi-persistent transmission resource, until allocation of the semi-persistent transmission resource is complete.

In a possible design, the transmitting, by the UE, data in the logical channel having the correspondence with the semi-persistent transmission resource includes:

preferentially allocating, by the UE, a semi-persistent transmission resource to all to-be-transmitted data in the logical channel corresponding to the semi-persistent transmission resource, until transmission resources sufficient for transmitting all the to-be-transmitted data are allocated to all the to-be-transmitted data in the corresponding logical channel.

In a possible design, the method further includes: when the semi-persistent transmission resource having the correspondence with the logical channel in which the to-be-transmitted data is located further includes an unoccupied idle resource, transmitting, on the idle resource, data in a logical channel having no correspondence with the semi-persistent transmission resource.

According to a third aspect, a semi-persistent transmission method is provided, including:

allocating, by a network device, a semi-persistent transmission resource to UE, and determining a logical channel having a correspondence with the semi-persistent transmission resource; and sending, by the network device to the UE, information about the semi-persistent transmission resource allocated to the UE and information about the logical channel having the correspondence with the semi-persistent transmission resource.

In a possible design, before the allocating, by a network device, a semi-persistent transmission resource to UE, the method further includes:

receiving, by the network device, a terminal capability report from the UE, where the terminal capability report carries indication information indicating whether the UE supports a plurality of parallel semi-persistent scheduling configurations.

In a possible design, the allocating, by a network device, a semi-persistent transmission resource to UE includes:

receiving, by the network device, terminal assistance information from the UE, where the terminal assistance information includes service characteristic information of at least one logical channel; and allocating, by the network device, the semi-persistent transmission resource to the UE based on the service characteristic information of the logical channel.

In a possible design, the sending, by the network device to the UE, information about the semi-persistent transmission resource allocated to the UE and information about the logical channel having the correspondence with the semi-persistent transmission resource includes:

sending, by the network device, semi-persistent resource configuration information corresponding to the semi-persistent transmission resource to the UE.

In a possible design, after the sending, by the network device, semi-persistent resource configuration information to the UE, the method further includes:

sending, by the network device, an activation message to the UE, where the activation message indicates the semi-persistent transmission resource allocated to the UE.

In a possible design, in a sidelink communication scenario, the indication information is used to indicate that the UE supports a plurality of sidelink-based semi-persistent scheduling configurations.

In a possible design, in a sidelink communication scenario, the service characteristic information is used to indicate a service characteristic of a sidelink-based logical channel.

In a possible design, the service characteristic information includes one parameter or a combination of a plurality of parameters of the following: a logical channel identifier LCID, a layer 2 target address, a data packet arrival period, a data packet arrival moment, a data packet size, and a data packet priority.

In a possible design, the data packet priority is a ProSe Per-Packet Priority.

In a possible design, the semi-persistent resource configuration information includes one parameter or a combination of a plurality of parameters of the following: a semi-persistent configuration identifier, a semi-persistent scheduling interval, a modulation and coding scheme, an LCID, and a layer 2 target address.

In a possible design, the activation message further carries one parameter or a combination of a plurality of parameters of the following: the semi-persistent configuration identifier, the LCID, the layer 2 target address, and a semi-persistent scheduling type indicator.

In a possible design, in an uplink communication scenario, the indication information is used to indicate that the UE supports a plurality of uplink-based semi-persistent scheduling configurations.

In a possible design, in an uplink communication scenario, the service characteristic information is used to indicate a service characteristic of an uplink-based logical channel.

In a possible design, the service characteristic information includes one parameter or a combination of a plurality of parameters of the following: an LCID, a data packet arrival period, a data packet arrival moment, and a data packet size.

In a possible design, the semi-persistent resource configuration information includes one parameter or a combination of a plurality of parameters of the following: a semi-persistent configuration identifier, a semi-persistent scheduling interval, and an LCID.

In a possible design, the activation message further carries one parameter or a combination of a plurality of parameters of the following: a semi-persistent configuration identifier, an LCID, and a semi-persistent scheduling type indicator.

According to a fourth aspect, to implement the semi-persistent transmission method in the foregoing first aspect, an embodiment of the present invention provides a semi-persistent transmission apparatus, and the semi-persistent transmission apparatus has a function of implementing behavior of the UE in the foregoing semi-persistent transmission method. The function may be implemented by hardware, or may be implemented by hardware by executing corresponding software. The hardware or the software includes one or more modules corresponding to the foregoing function.

In a possible design, the semi-persistent transmission apparatus includes a plurality of functional units, configured to implement any semi-persistent transmission method in the foregoing first aspect, so that there is a correspondence between a semi-persistent transmission resource and a logical channel, and it is ensured that the UE transmits, on the transmission resource, data in the logical channel corresponding to the transmission resource when performing data transmission, to implement scheduled transmission of various semi-persistent service data and avoid problems such as a transmission failure, a packet loss, and a waste of a semi-persistent transmission resource that are caused by data multiplexing between logical channels and an improper transmission order.

In a possible design, the semi-persistent transmission apparatus includes an obtaining unit, a determining unit, and a transmission unit, where the obtaining unit is configured to obtain a semi-persistent transmission resource; the determining unit is configured to determine a logical channel having a correspondence with the semi-persistent transmission resource; and the transmission unit is configured to transmit, on the semi-persistent transmission resource, data in the logical channel having the correspondence with the semi-persistent transmission resource.

According to a fifth aspect, to implement the semi-persistent transmission method in the foregoing second aspect, an embodiment of the present invention provides a semi-persistent transmission apparatus, and the semi-persistent transmission apparatus has a function of implementing behavior of the UE in the foregoing semi-persistent transmission method. The function may be implemented by hardware, or may be implemented by hardware by executing corresponding software. The hardware or the software includes one or more modules corresponding to the foregoing function.

In a possible design, the semi-persistent transmission apparatus includes a plurality of functional units, configured to implement any semi-persistent transmission method in the foregoing second aspect, so that there is a correspondence between a semi-persistent transmission resource and a logical channel, and it is ensured that the UE transmits, on the transmission resource, data in the logical channel corresponding to the transmission resource when performing data transmission, to implement scheduled transmission of various semi-persistent service data and avoid problems such as a transmission failure, a packet loss, and a waste of a semi-persistent transmission resource that are caused by data multiplexing between logical channels and an improper transmission order.

In a possible design, the semi-persistent transmission apparatus includes an obtaining unit and a transceiver unit, where the obtaining unit is configured to: when it is determined that there is to-be-transmitted data in a logical channel, obtain a semi-persistent transmission resource having a correspondence with the logical channel; and the transceiver unit is configured to transmit, on the semi-persistent transmission resource, data in the logical channel having the correspondence with the semi-persistent transmission resource.

According to a sixth aspect, to implement the semi-persistent transmission method in the foregoing third aspect, an embodiment of the present invention provides a semi-persistent transmission apparatus, and the semi-persistent transmission apparatus has a function of implementing behavior of the network device in the foregoing semi-persistent transmission method. The function may be implemented by hardware, or may be implemented by hardware by executing corresponding software. The hardware or the software includes one or more modules corresponding to the foregoing function.

In a possible design, the semi-persistent transmission apparatus includes an allocation unit and an information transceiver unit, where the allocation unit is configured to allocate a semi-persistent transmission resource to UE, and determine a logical channel having a correspondence with the semi-persistent transmission resource; and the information transceiver unit is configured to send, to the UE, information about the semi-persistent transmission resource allocated to the UE and information about the logical channel having the correspondence with the semi-persistent transmission resource.

According to a seventh aspect, an embodiment of the present invention provides a computer storage medium. The computer storage medium is configured to store a computer software instruction used by the semi-persistent transmission apparatus in the foregoing fourth aspect, and the computer software instruction includes a program designed to execute in the foregoing aspect.

According to an eighth aspect, an embodiment of the present invention provides a computer storage medium. The computer storage medium is configured to store a computer software instruction used by the semi-persistent transmission apparatus in the foregoing fifth aspect, and the computer software instruction includes a program designed to execute the foregoing aspect.

According to a ninth aspect, an embodiment of the present invention provides a computer storage medium. The computer storage medium is configured to store a computer software instruction used by the semi-persistent transmission apparatus in the foregoing sixth aspect, and the computer software instruction includes a program designed to execute the foregoing aspect.

According to the semi-persistent transmission solutions in the embodiments of the present invention, there is a correspondence between the semi-persistent transmission resource and the logical channel, and it is ensured that the UE transmits, on the transmission resource, data in the logical channel corresponding to the transmission resource when performing data transmission, to implement scheduled transmission of various semi-persistent service data and avoid problems such as a transmission failure, a packet loss, and a waste of a semi-persistent transmission resource that are caused by data multiplexing between logical channels and an improper transmission order.

BRIEF DESCRIPTION OF DRAWINGS

To describe the technical solutions in this application more clearly, the following briefly describes the accompanying drawings required for describing the embodiments. Apparently, a person of ordinary skill in the art may derive other drawings from these accompanying drawings without creative efforts.

DESCRIPTION OF EMBODIMENTS

Network architectures and service scenarios described in the embodiments of the present invention are intended to describe the technical solutions in the embodiments of the present invention more clearly, but do not constitute a limitation on the technical solutions provided in the embodiments of the present invention. A person of ordinary skill in the art may know that as the network architectures evolve and new service scenarios emerge, the technical solutions provided in the embodiments of the present invention are also applicable to a similar technical problem.

Figure 1:
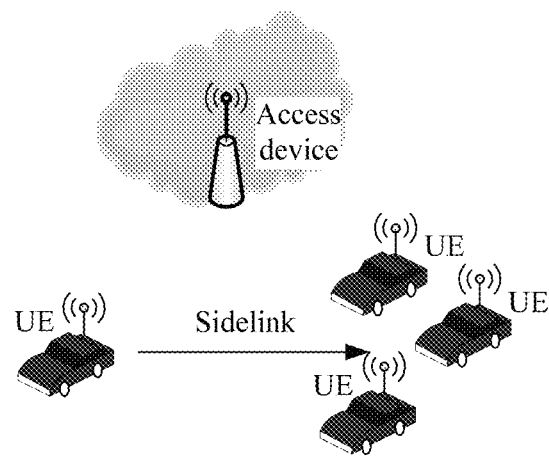
FIG. 1 is a schematic diagram of a possible application scenario according to the present invention.

FIG. 1 is a schematic diagram of a possible application scenario according to the present invention. As shown in FIG. 1, the scenario includes an access device and a plurality of UEs, where the access device is configured to allocate a semi-persistent transmission resource to each UE, and data transmission and information exchange are performed between the UEs by using a D2D direct communication technology. In the scenario shown in FIG. 1, a link used for direct data communication between the UEs is referred to as a sidelink (SL).

Figure 2:
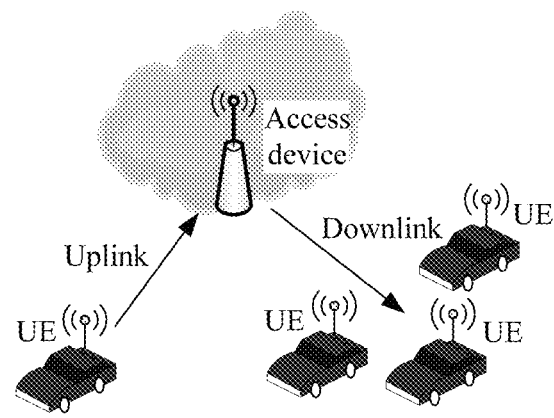
FIG. 2 is a schematic diagram of another possible application scenario according to the present invention.

FIG. 2 is a schematic diagram of another possible application scenario according to the present invention. As shown in FIG. 2, each UE is connected to an access device, and data communication between UEs requires the access device to perform forwarding. A radio link on which UE sends data to the access device is referred to as an uplink (UL), and a radio link on which the access device sends data to UE is referred to as a downlink (DL).

A semi-persistent transmission method provided in this embodiment of the present invention is not only applicable to the application scenarios shown in FIG. 1 and FIG. 2, but also applicable to another communications system including an SL and a UL.

The UE in the present invention is mainly a terminal device related to V2X, such as an in-vehicle terminal. Certainly, the UE may alternatively be various handheld devices, in-vehicle devices, wearable devices, and computing devices that have a wireless communication function, or another processing device connected to a wireless modem, or may be user equipment (UE), a mobile station (MS), a terminal, terminal equipment, and the like that are in various forms. For ease of description, in this application, the devices mentioned above are collectively referred to as user equipment or UE.

The access device in the present invention is a device in an access network, such as a base station. The base station (BS) in the present invention is an apparatus that is deployed in a radio access network and that is configured to provide a wireless communication function for the UE. The base station may include a macro base station, a micro base station, a relay station, an access point, and the like in various forms. In systems using different radio access technologies, a name of a device having a base station function may vary, and may be, for example, referred to as an evolved NodeB (eNB or eNodeB) in an LTE network, or referred to as a NodeB in a third generation 3G network. For ease of description, in this application, the apparatus providing a wireless communication function for UE is collectively referred to as a base station or BS. A network device in the present invention includes the foregoing access device, and may include a core network device such as a mobility management entity (MME) and a data gateway.

An existing uplink semi-persistent scheduled transmission technology can support only one semi-persistent transmission resource, and cannot adapt to a requirement of multi-path service data transmission. Even if multi-path semi-persistent transmission resources are configured for the UE according to an existing semi-persistent scheduling mechanism, disordered service transmission may occur. For example, an SPS1 resource configured in the UE matches a period of a service 1, and an SPS2 resource matches a service 2. When the UE transmits the service 1 and the service 2, the service 1 may preempt the SPS2 resource and the service 2 may preempt the SPS1 resource.

To resolve the foregoing problems in the prior art, this embodiment of the present invention provides a semi-persistent transmission solution. The semi-persistent transmission solution supports one or more semi-persistent transmission configurations in the UE. In the solution of the present invention, there is a correspondence between a semi-persistent transmission resource and a logical channel, and it is ensured that data in the logical channel corresponding to the transmission resource is transmitted on the transmission resource during data transmission, thereby avoiding problems such as a transmission failure, a packet loss, and a waste of a semi-persistent transmission resource that are caused by data multiplexing between logical channels and an improper transmission order.

"Correspondence" in this application may be considered as "binding relationship", and "correspond" may be considered as a type of "binding". For example, there is a correspondence between a semi-persistent transmission resource and a logical channel, which may be considered as a binding between the semi-persistent transmission resource and the logical channel. There is a binding relationship between the semi-persistent transmission resource and the logical channel.

The following describes the semi-persistent transmission method in this embodiment of the present invention in detail with reference to the accompanying drawings.

Figure 3:
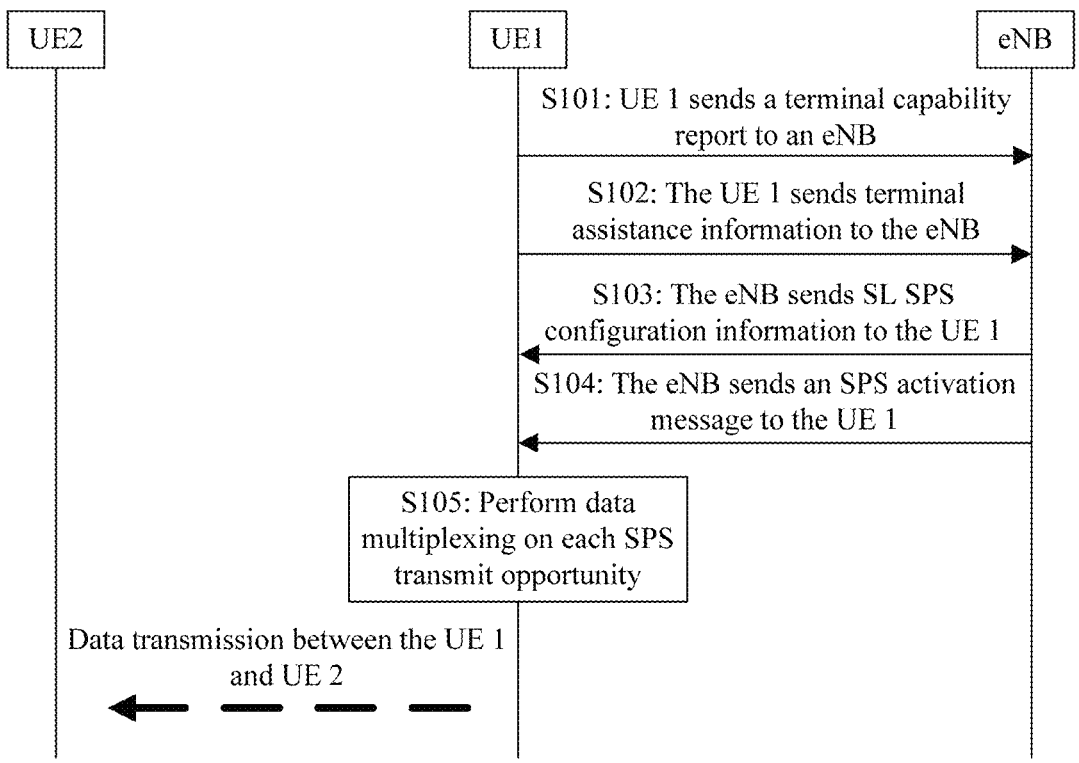
FIG. 3 is a flowchart of a semi-persistent transmission method according to Embodiment 1 of the present invention.

FIG. 3 is a flowchart of a semi-persistent transmission method according to Embodiment 1 of the present invention. The method shown in FIG. 3 is performed in the communications system including the SL shown in FIG. 1. For example, in an LTE-V2X scenario, the method shown in FIG. 3 includes the following steps.

S101: UE 1 sends a terminal capability report to an eNB, where the terminal capability report carries indication information indicating whether the UE 1 supports a plurality of SPS configurations.

In the scenario shown in FIG. 1, the indication information in the terminal capability report is used to indicate whether the UE supports a plurality of SPS configurations based on a sidelink.

An existing 3GPP LTE protocol release does not support a mechanism of a plurality of parallel SPS configurations on a sidelink, and UE based on the existing protocol release (in Rel-13 and earlier releases) may not support the technology either. Therefore, the UE needs to enhance a function of the UE on a basis of the existing LTE protocol release. To support the mechanism of a plurality of parallel SPS configurations, the function of the UE needs to be enhanced according to the technical solutions of the present invention.

In view of this, the UE needs to perform this step to report, to the eNB, whether the UE is capable of supporting the mechanism of a plurality of sidelink-based parallel SPS configurations, to assist the eNB in performing SPS configuration and activating a corresponding decision.

If a terminal capability reported by the UE cannot support the mechanism of a plurality of parallel SPS configurations, the eNB performs resource scheduling for the UE based on a sidelink communication technology of the existing LTE release. If the terminal capability reported by the UE indicates that the UE supports the mechanism of a plurality of sidelink-based parallel SPS configurations, the UE and the eNB perform the following steps.

Step 102: The UE 1 sends terminal assistance information to the eNB.

The UE 1 reports a service characteristic of an SL logical channel of the UE 1 to the eNB by using the terminal assistance information, to request the eNB to perform SL SPS configuration and/or activation for service data of the corresponding SL logical channel. In the scenario shown in FIG. 1, the terminal assistance information reported by the UE 1 indicates a service characteristic of an SL-based logical channel.

Optionally, the terminal assistance information includes service characteristic information of at least one SL logical channel, and service characteristic information of each SL logical channel includes but is not limited to one parameter or a combination of a plurality of parameters of the following: a logical channel identifier LCID, a layer 2 target address, a data packet arrival period, a data packet arrival moment, a data packet size, and a data packet priority. The data packet priority may be a ProSe Per-Packet Priority (PPPP). A parameter included in the service characteristic information is merely used as an example, and the parameter included in the service characteristic information corresponding to each SL logical channel is not specifically limited in the present invention.

In the foregoing parameters in the service characteristic information, the LCID and the layer 2 target address can uniquely identify and determine an SL logical channel. A PPPP corresponding to each SL logical channel indicates a priority of the SL logical channel, and the eNB may obtain quality of service (QoS) requirements such as a requirement for a latency and reliability of service data in the corresponding SL logical channel by using the PPPP. The data packet arrival period may be set to a special value, for example, "Inf", to identify a corresponding service data packet arrival period as "aperiodic".

Alternatively, a trigger condition for sending the terminal assistance information by the UE 1 to the eNB may be: The UE 1 sends the terminal assistance information to the eNB when the UE 1 determines that service data periodically arrives at one or more SL logical channels; or when the UE 1 determines that an arrival period of data in one or more SL logical channels changes, which includes a change from one period to another period or from "periodic" to "aperiodic". An implementation method of the UE is not specifically limited herein.

An implementation method for obtaining, by the UE, the data packet arrival period in each SL logical channel may be as follows: For a logical channel, the UE may set a counter for the logical channel and record an arrival interval of each data packet. When arrival intervals of latest M data packets are all equal, the arrival interval is considered as the data packet arrival period; or when a variance of arrival intervals of latest M data packets is less than a threshold value, an average value of the arrival intervals is considered as the data packet arrival period of the SL logical channel. The method for obtaining, by the UE, the data packet arrival period herein depends on implementation of the UE. No specific limitation is imposed herein.

Optionally, the terminal assistance information in this step may be sent by the UE 1 to the eNB by using an RRC dedicated message or by using a Medium Access Control (MAC) control element (MAC CE).

Step S103: The eNB sends SL SPS configuration information to the UE 1.

Optionally, the eNB sends the SL SPS configuration information to the UE 1 by using the RRC dedicated message, where the SL SPS configuration information may include a plurality of pieces of parallel SL SPS configuration information, and each piece of SL SPS configuration information corresponds to one SL SPS configuration.

Optionally, configuration information that is of each SL SPS configuration and sent by the eNB to the UE 1 includes but is not limited to one parameter or a combination of a plurality of parameters of the following: an SPS ID, an SPS interval, a modulation and coding scheme (MCS), an LCID, a layer 2 target address, and a PPPP. The parameter included in the SL SPS configuration information is merely used as an example, and a parameter included in each piece of SL SPS configuration information is not specifically limited in the present invention.

An SPS ID in each piece of SL SPS configuration information uniquely identifies a specific SL SPS configuration and a corresponding group of configuration parameters. For a specific SL SPS configuration, when the specific SL SPS configuration includes the LCID and the layer 2 target address, the LCID and the layer 2 target address uniquely indicate one SL logical channel.

In this step, the eNB may configure, for the UE 1 based on the service characteristic (such as the data packet arrival period, the data arrival moment, and the data packet size) that is of the corresponding SL logical channel and that is reported in the terminal assistance information, SL SPS configuration parameters matching the service characteristic of the SL logical channel, including the SPS ID, the SPS interval, the MCS, and the LCID and the layer 2 target address (optional) that identify the SL logical channel, and send the SL SPS configuration parameters to the UE 1. Specifically, how to set values of the parameters such as the SPS ID, the SPS interval, and the MCS based on the service characteristic depends on algorithm implementation of the eNB. No specific limitation is imposed herein.

In addition, the UE 1 uses the SL SPS configuration information received in this step to overwrite SL SPS configuration information that may be previously received and has a same SPS ID. However, if SPS IDs corresponding to the SL SPS configuration information received by the UE 1 are all different from SPS IDs of existing SL SPS configurations, the UE 1 separately stores, on a basis of the existing SL SPS configurations, these SL SPS configurations received in this step.

Step S104: The eNB sends an SPS activation message to the UE 1.

The UE 1 activates a corresponding SL SPS configuration by using the SPS activation message sent by the eNB, and indicates an SL SPS transmission resource for the activated SL SPS configuration. The UE 1 further establishes a correspondence between a specified SL logical channel, and the activated SL SPS configuration and the corresponding SL SPS transmission resource.

Optionally, the SL SPS activation message includes one parameter or a combination of a plurality of parameters of the following: the SPS ID, the SL SPS transmission resource, the LCID, the layer 2 target address, and an SPS type indicator.

The eNB may allocate, based on the service characteristic parameter (for example, the data packet size) that is of the SL logical channel and that is reported in the terminal assistance information, a corresponding SL SPS transmission resource to the SL logical channel of the UE 1. A specific resource allocation method depends on algorithm implementation of the eNB. No limitation is imposed herein.

After receiving the activation message, the UE 1 activates, based on the SPS ID in the activation message, the SL SPS configuration including the same SPS ID, so that subsequently, the UE 1 can periodically transmit data to another UE, such as UE 2, based on the included MCS by using the SPS interval included in the activated SL SPS configuration as a period and by using the SL SPS transmission resource allocated by the eNB.

In this step, that the UE 1 establishes a correspondence between a specified SL logical channel, and the activated SL SPS configuration and the corresponding SL SPS transmission resource includes:

(1) If the activation message includes the LCID and the layer 2 target address, and the LCID and the layer 2 target address can uniquely identify an SL logical channel, the UE 1 determines a correspondence between a semi-persistent transmission resource indicated by the activation message and a logical channel determined by the LCID and the layer 2 target address in the activation message.

(2) If each piece of SL SPS configuration information includes the LCID and the layer 2 target address, and the LCID and the layer 2 target address can uniquely identify an SL logical channel, the UE 1 determines a correspondence between a logical channel determined by the LCID and the layer 2 target address in the SL SPS configuration information, and an activated semi-persistent resource configuration and a semi-persistent transmission resource indicated by the activation message.

(3) If the activation message includes the LCID and the layer 2 target address, and the LCID and the layer 2 target address can uniquely identify an SL logical channel, the UE 1 determines a correspondence between an activated semi-persistent resource configuration and a logical channel determined by the LCID and the layer 2 target address in the activation message.

In conclusion, regardless of the foregoing manners, the UE 1 establishes, based on the SL SPS configuration information or the LCID or the layer 2 target address carried in the activation message, a correspondence between the specified SL logical channel, and the activated SL SPS configuration and the SL SPS transmission resource corresponding to the SL SPS configuration.

Optionally, the SPS type indicator may be a 1-bit identifier, which is used to distinguish a type of the activated SL SPS configuration. For example, when the indicator is set to 1, it indicates that the activated SPS configuration is an SL SPS configuration, or when the indicator is set to 2, it indicates that the activated SPS configuration is a UL SPS configuration.

Optionally, the activation message may be specifically sent by the eNB to the UE 1 by using downlink control information (DCI).

If the UE 1 has activated an SL SPS configuration having a same SPS ID as that of the activated SL SPS configuration in this step and has allocated a corresponding SL SPS transmission resource before this step is performed, the UE 1 first deactivates the existing activated SL SPS configuration and releases the corresponding SL SPS transmission resource after receiving the activation message in this step, and then reactivates the corresponding SL SPS configuration based on the activation message in this step and uses the corresponding SL SPS transmission resource to transmit data. Otherwise, the UE 1 may activate the SL SPS configuration in parallel in this step on a basis of another activated SL SPS configuration, and use a plurality of SPS resources corresponding to SL SPS configurations for data transmission.

Optionally, if the eNB needs to perform reporting based on the terminal assistance information of the UE 1 in S102 and a plurality of SL SPS configurations need to be activated, a plurality of SL SPS activation messages may be sent to the UE 1.

After this step, the UE 1 may activate a plurality of SL SPS configurations to respectively correspond to a plurality of parallel SL SPS transmission resources, and each of the activated SL SPS configurations and a corresponding SL SPS transmission resource correspond to the specified SL logical channel.

Step S105: For an activated SL SPS configuration, the UE 1 transmits, on a corresponding SL SPS resource, data in an SL logical channel having a correspondence with the SL SPS resource.

For the SL SPS transmission resource corresponding to the activated SL SPS configuration, the UE 1 allocates the SL SPS resource to the SL logical channel by using the following method, to multiplex data in logical channels to a MAC PDU.

When an amount of to-be-transmitted data in the SL logical channel is greater than an amount of data that can be accommodated in the SL SPS transmission resource corresponding to the SL logical channel, the UE 1 preferentially allocates a resource to the to-be-transmitted data in the SL logical channel corresponding to the SL SPS configuration, until all SL SPS transmission resources are used up. When the SL SPS transmission resource is sufficient for accommodating all data in the SL logical channel corresponding to the SL SPS transmission resource for transmission, the UE 1 allocates sufficient transmission resources to all the to-be-transmitted data in the corresponding SL logical channel.

Further, if the SL SPS transmission resources are not fully allocated, a resource is allocated to data in another SL logical channel according to a logical channel prioritization procedure (Logical Channel Prioritization Procedure) method for sidelink communication in an existing LTE protocol.

After processing is performed according to the foregoing method, the UE 1 determines, based on a size of a resource allocated to each SL logical channel, an amount of data that can be multiplexed by the SL logical channel, accordingly multiplexes service data in the corresponding SL logical channel to the MAC PDU, and performs sidelink transmission of the MAC PDU by using the SL SPS transmission resource.

Because in the foregoing step, the SPS transmission resource corresponding to the activated SL SPS configuration is preferentially allocated to the SL logical channel corresponding to the SL SPS configuration, it may be ensured in this step that an SL SPS transmission resource of each activated SL SPS configuration is used to transmit the SL corresponding to each activated SL SPS configuration.

The SPS resource corresponding to each activated SL SPS configuration periodically reappears. Therefore, each time the SL SPS transmission resource appears, the UE 1 allocates a resource on the SL logical channel by using the foregoing method, to determine an amount of data that can be transmitted in each SL logical channel and complete multiplexing of the to-be-transmitted data.

According to the technical solution of this embodiment of the present invention, the activated SPS configuration corresponds to the corresponding logical channel, and data transmission performance is ensured by improving a data multiplexing procedure at an existing MAC layer, to avoid potential problems such as a packet loss or a resource waste caused by data multiplexing and an improper transmission order after a plurality of parallel SPS configurations are activated.

Figure 4:
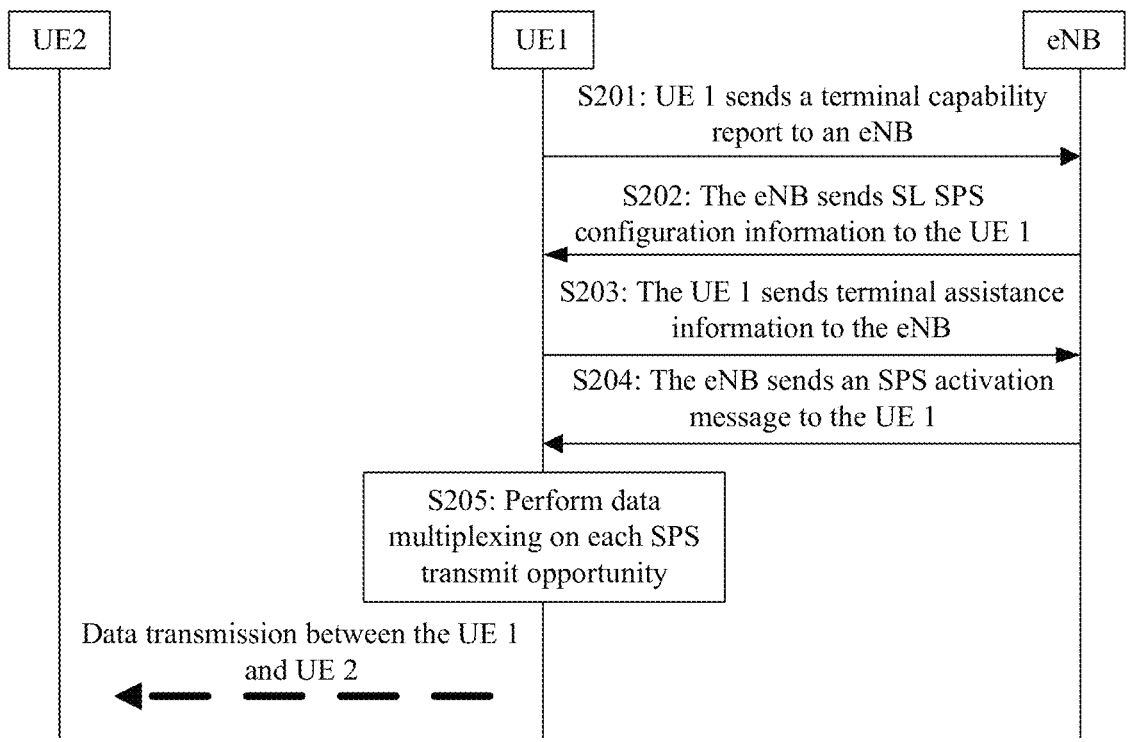
FIG. 4 is a flowchart of a semi-persistent transmission method according to Embodiment 2 of the present invention.

FIG. 4 is a flowchart of a semi-persistent transmission method according to Embodiment 2 of the present invention. The method shown in FIG. 4 is performed in the communications system including the SL shown in FIG. 1, and includes the following steps.

Step S201: UE 1 sends a terminal capability report to an eNB, where the terminal capability report carries indication information indicating whether the UE 1 supports a plurality of parallel SL SPS configurations.

Step S202: The eNB sends SL SPS configuration information to the UE 1.

In this step, the eNB may configure all possible SL SPS configuration information for the UE 1 at a time. All possible values of parameters (such as an SPS ID, an SPS interval, an MCS, and an LCID) included in each piece of SL SPS configuration information may be stipulated by a standard protocol, or configured by an operator to which the eNB belongs, or set by an eNB manufacturer. No specific limitation is imposed herein. A possible value of a layer 2 target address corresponding to the UE 1 is reported by the UE 1 to the eNB according to the prior art.

Step S203: The UE 1 sends terminal assistance information to the eNB.

In this step, the UE 1 may report a service characteristic of an SL logical channel of the UE 1 to the eNB in a manner of configuring the terminal assistance information in Embodiment 1, to request the eNB to perform SL SPS configuration and/or activation for service data of the corresponding SL logical channel.

Step S204: The eNB sends an SPS activation message to the UE 1.

The UE 1 activates a corresponding SL SPS configuration by using the SPS activation message sent by the UE 1, and the activation message is further used to indicate an SL SPS transmission resource for the activated SL SPS configuration. The UE 1 further establishes a correspondence between a specified SL logical channel, and the activated SL SPS configuration and the corresponding SL SPS transmission resource.

Step S205: For an activated SL SPS configuration, the UE 1 transmits, on a corresponding SL SPS resource, data in an SL logical channel having a correspondence with the SL SPS resource.

For steps implemented by using the method in Embodiment 2 of the present invention, refer to Embodiment 1. A difference between the method in Embodiment 2 and that in Embodiment 1 merely lies in that, in Embodiment 1, the UE 1 receives the SPS configuration information sent by the eNB after sending the terminal assistance information to the eNB, and in Embodiment 2, the eNB first sends all possible SPS configuration information to the UE 1, and then the UE 1 sends the terminal assistance information to the eNB to request the eNB to activate one or more SPS configurations specified by the UE 1.

Figure 5:
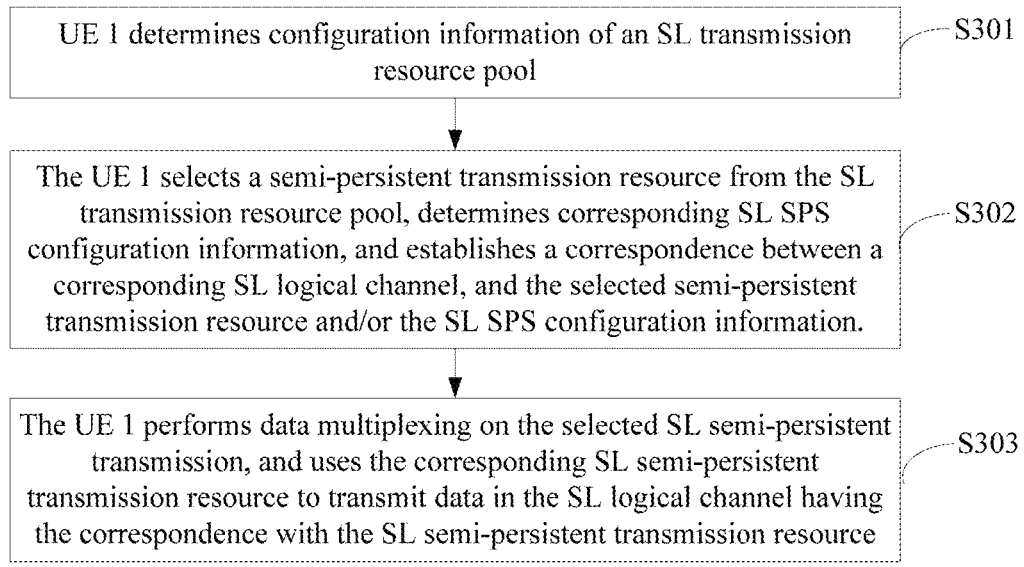
FIG. 5 is a flowchart of a semi-persistent transmission method according to Embodiment 3 of the present invention.

FIG. 5 is a flowchart of a semi-persistent transmission method according to Embodiment 3 of the present invention. The method shown in FIG. 5 is performed in the communications system including the SL shown in FIG. 1, and includes the following steps.

Step 301: UE 1 determines configuration information of an SL transmission resource pool.

The UE 1 determines, based on the configuration information of the SL transmission resource pool, an SL transmission resource pool allocated by a network device and a resource included in the transmission resource pool. Specifically, the SL transmission resource pool includes a set of time-frequency resources for SL data transmission.

Optionally, the UE 1 obtains the configuration information of the SL transmission resource pool by using an eNB. For example, the eNB may send the configuration information of the SL transmission resource pool to the UE 1 by using a system information broadcast or an RRC dedicated message.

Optionally, a terminal manufacturer may alternatively preconfigure the configuration information of the SL transmission resource pool in UE according to factors such as a related stipulation of a protocol and/or a spectrum plan of an operator.

Step 302: The UE 1 selects, based on a service characteristic of an SL logical channel of the UE 1, a semi-persistent transmission resource from the SL transmission resource pool, determines corresponding SL SPS configuration information, and establishes a correspondence between the corresponding SL logical channel, and the selected semi-persistent transmission resource and/or the SL SPS configuration information.

Optionally, in this step, a trigger condition for selecting the semi-persistent transmission resource and determining the corresponding SL SPS configuration information by the UE 1 may be the same as the trigger condition for determining, by the UE 1, to send the terminal assistance information to the eNB in Embodiment 1.

The UE 1 determines, based on the service characteristic (such as a data packet arrival period, a data arrival moment, and a data packet size) of the corresponding SL logical channel of the UE 1, an SL semi-persistent resource configuration parameter matching the service characteristic of the SL logical channel, and determines a corresponding semi-persistent resource configuration. Optionally, a parameter included in the semi-persistent resource configuration determined by the UE may be any combination of the following parameters: an SPS ID, an SPS interval, an MCS, an LCID, a layer 2 target address, and the like. Specifically, how to set values of the parameters such as the SPS ID, the SPS interval, and the MCS based on the service characteristic depends on algorithm implementation of the UE. No specific limitation is imposed herein.

Optionally, the method for selecting, by the UE 1, the semi-persistent transmission resource for the SL logical channel may be randomly selecting, by the UE 1, a specific resource from the SL transmission resource pool, or selecting, by the UE 1, an idle resource from a current SL transmission resource pool based on a detection result of the UE 1 on resource load in the SL resource pool. A specific resource selection method herein depends on algorithm implementation of the UE. No specific limitation is imposed herein.

After configuring a corresponding semi-persistent resource configuration for the SL logical channel of the UE and selecting the semi-persistent transmission resource, the UE makes the semi-persistent transmission resource correspond to the corresponding SL logical channel, that is, determines a correspondence between the semi-persistent transmission resource and the corresponding SL logical channel.

Step 303: The UE 1 performs data multiplexing on the selected SL semi-persistent transmission, and uses the corresponding SL semi-persistent transmission resource to transmit data in the SL logical channel having the correspondence with the SL semi-persistent transmission resource.

Specific content of this step is the same as step 105 in the foregoing Embodiment 1, and details are not described herein again.

Figure 6:
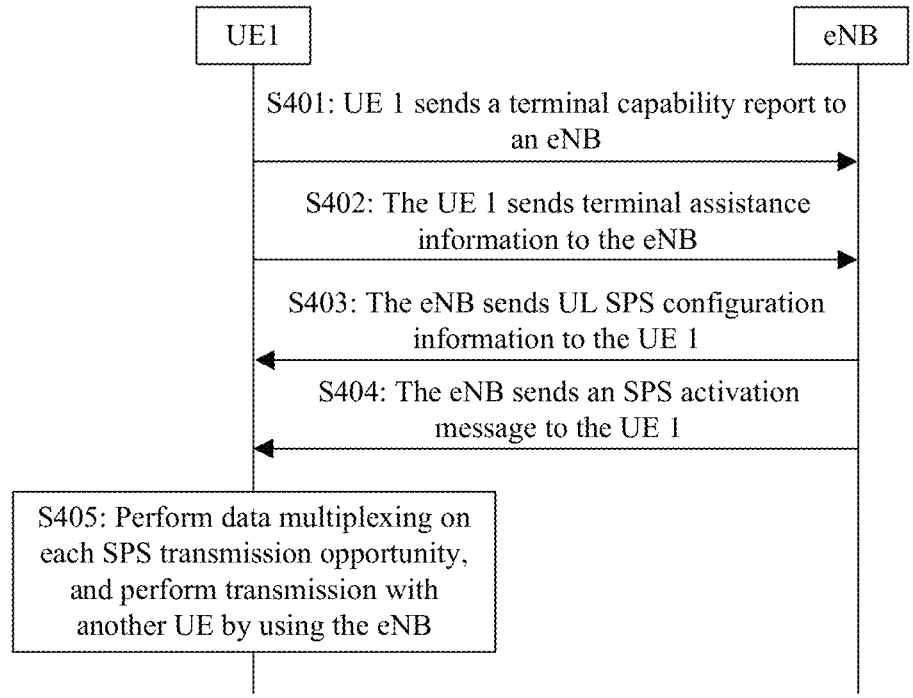
FIG. 6 is a flowchart of a semi-persistent transmission method according to Embodiment 4 of the present invention.

FIG. 6 is a flowchart of a semi-persistent transmission method according to Embodiment 4 of the present invention. The method shown in FIG. 6 is performed in the communications system including the UL shown in FIG. 2. For example, in an LTE-V2X scenario, the method shown in FIG. 6 includes the following steps.

S401: UE 1 sends a terminal capability report to an eNB, where the terminal capability report carries indication information indicating whether the UE 1 supports a plurality of SPS configurations.

In the scenario shown in FIG. 2, the indication information is used to indicate whether the UE 1 supports a plurality of parallel UL-based SPS configurations.

S402: The UE 1 sends terminal assistance information to the eNB.

The UE 1 reports a service characteristic of a UL logical channel of the UE 1 to the eNB by using the terminal assistance information, to request the eNB to perform UL SPS configuration and/or activation for service data of the corresponding UL logical channel. In the scenario shown in FIG. 2, the terminal assistance information reported by the UE 1 indicates a service characteristic of a UL-based logical channel.

Optionally, the terminal assistance information may include service characteristic information of one or more UL logical channels, and service characteristic information corresponding to each UL logical channel includes but is not limited to one parameter or a combination of a plurality of parameters of the following: an logical channel identifier (LCID) corresponding to the UL logical channel, a data packet arrival period, a data packet arrival moment, a data packet size, and the like. The parameter included in the service characteristic information is merely used as an example, and the parameter included in the service characteristic information corresponding to each SL logical is not specifically limited in the present invention.

In the parameters in the service characteristic information, the LCID can uniquely identify and determine a UL logical channel. Because the UL logical channel is configured for the UE by the eNB, the eNB learns quality of service (QoS) requirements such as a requirement for a latency and reliability of service data in each logical channel corresponding to the LCID of the UE.

Step 403: The eNB sends UL SPS configuration information to the UE 1.

Optionally, the eNB sends the UL SPS configuration information to the UE 1 by using an RRC dedicated message, where the UL SPS configuration information may include a plurality of parallel UL SPS configurations, and each piece of UL SPS configuration information corresponds to one UL SPS configuration.

Optionally, configuration information that is of each UL SPS configuration and sent by the eNB to the UE 1 includes but is not limited to one parameter or a combination of a plurality of parameters of the following: an SPS ID, an SPS interval, and an LCID. The configuration information included in each UL SPS configuration is not specifically limited herein.

The SPS ID in each piece of UL SPS configuration information uniquely identifies a specific UL SPS configuration and a corresponding group of configuration parameters. When a specific SPS configuration includes the LCID, the LCID uniquely indicates one UL logical channel.

Step 404: The eNB sends an SPS activation message to the UE 1.

The UE 1 activates a corresponding UL SPS configuration by using the SPS activation message sent by the eNB, and indicates a UL SPS transmission resource for the activated UL SPS configuration. The UE 1 further establishes a correspondence between a specified UL logical channel, and the activated UL SPS configuration and the corresponding UL SPS transmission resource.

Optionally, the UL SPS activation message includes one parameter or a combination of a plurality of parameters of the following: the SPS ID, the SL SPS transmission resource, the LCID, and an SPS type indicator.

The eNB may allocate, based on the service characteristic parameter (for example, the data packet size) that is of the corresponding SL logical channel and that is reported in the terminal assistance information, a corresponding UL SPS transmission resource to the UL logical channel of the UE 1.

A specific resource allocation method depends on algorithm implementation of the eNB. No limitation is imposed herein.

After receiving the activation message, the UE 1 activates, based on the SPS ID in the activation message, a UL SPS configuration including the same SPS ID, so that subsequently, the UE 1 can periodically transmit data to another UE, such as UE 2, based on the included MCS by using the SPS interval included in the activated UL SPS configuration as a period and by using the UL SPS transmission resource allocated by the eNB.

In this step, that the UE 1 establishes a correspondence between a specified UL logical channel, and the activated UL SPS configuration and the corresponding UL SPS transmission resource includes:

(1) If the activation message includes the LCID, and the LCID can uniquely identify a UL logical channel, the UE 1 determines a correspondence between a semi-persistent transmission resource indicated by the activation message and a logical channel determined by the LCID in the activation message.

(2) If each piece of UL SPS configuration information includes the LCID, and the LCID can uniquely identify a UL logical channel, the UE 1 determines a correspondence between a logical channel determined by the LCID in the UL SPS configuration information, and an activated semi-persistent resource configuration and a semi-persistent transmission resource indicated by the activation message.

(3) If the activation message includes the LCID, and the LCID can uniquely identify a UL logical channel, the UE 1 determines a correspondence between an activated semi-persistent resource configuration and a logical channel determined by the LCID in the activation message.

In conclusion, regardless of the foregoing manners, the UE 1 establishes, based on the LCID carried in the UL SPS configuration information or the activation message, a correspondence between the specified UL logical channel, and the activated UL SPS configuration and the UL SPS transmission resource corresponding to the UL SPS configuration.

In addition, optionally, the UL SPS configuration information activated in this step in this embodiment is allowed to not include the LCID, and the activation message does not include a corresponding LCID either. In this case, the activated UL SPS configuration and the corresponding SL SPS transmission resource do not correspond to any UL logical channel.

Step 405: For the activated UL SPS configuration, the UE 1 performs data multiplexing on the UL SPS resource, and uses the corresponding UL SPS transmission resource to transmit data in a corresponding UL logical channel.

An implementation method in this step is the same as that in S105 in Embodiment 1, and details are not described herein again. In addition, if in the foregoing step S404, the activated UL SPS configuration and the corresponding UL SPS transmission resource have no correspondence with any UL logical channel, the UE uses, on the UL SPS transmission resource, a logical channel prioritization procedure method for a UL in an existing LTE protocol to multiplex data in UL logical channels and perform data transmission for a multiplexed encapsulated MAC PDU by using the UL SPS resource. In addition, implementation methods in steps in this embodiment are correspondingly the same as those in Embodiment 1, and details are not described herein again.

Figure 7:
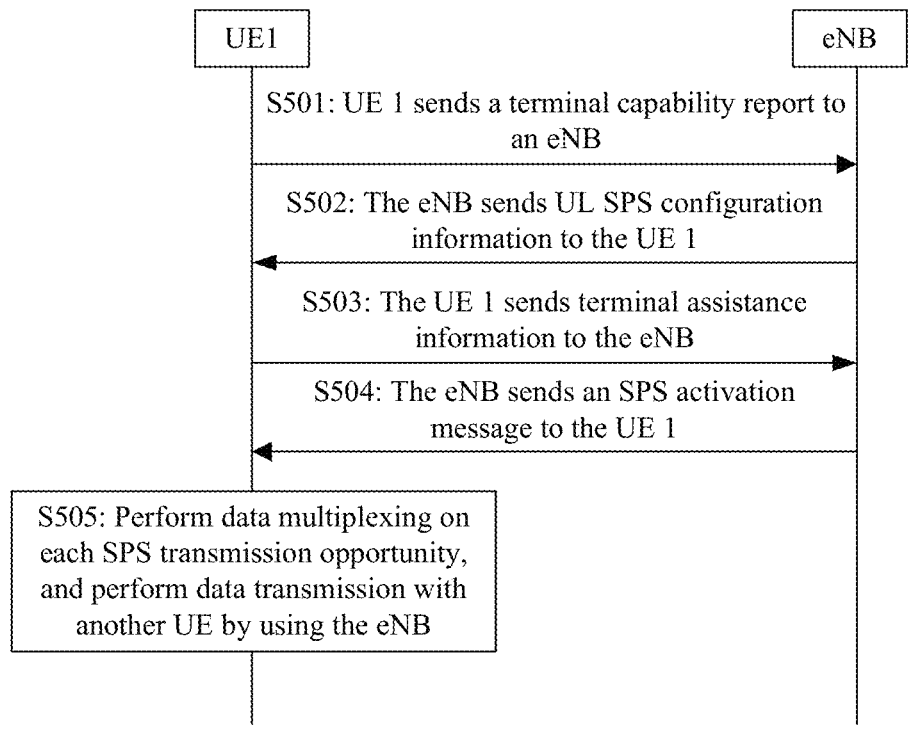
FIG. 7 is a flowchart of a semi-persistent transmission method according to Embodiment 5 of the present invention.

FIG. 7 is a flowchart of a semi-persistent transmission method according to Embodiment 5 of the present invention. A method shown in FIG. 7 is performed in the communications system including the UL shown in FIG. 2. For example, in an LTE-V2X scenario, the method shown in FIG. 7 includes the following steps.

Step S501: UE 1 sends a terminal capability report to an eNB, where the terminal capability report carries indication information indicating whether the UE 1 supports a plurality of parallel UL SPS configurations.

Step S502: The eNB sends UL SPS configuration information to the UE 1.

The eNB in this step may configure all possible UL SPS configuration information for the UE 1 at a time. All possible values of parameters (such as an SPS ID, an SPS interval, an MCS, and an LCID) included in each piece of UL SPS configuration information may be stipulated by a standard protocol, or configured by an operator to which the eNB belongs, or set by an eNB manufacturer. No specific limitation is imposed herein. A possible value of a layer 2 target address corresponding to the UE 1 is reported by the UE 1 to the eNB according to the prior art.

Step S503: The UE 1 sends terminal assistance information to the eNB.

In this step, the UE 1 may report a service characteristic of a UL logical channel of the UE 1 to the eNB in a manner of configuring the terminal assistance information in Embodiment 4, to request the eNB to perform UL SPS configuration and/or activation for service data of the corresponding UL logical channel.

Step S504: The eNB sends an SPS activation message to the UE 1.

The UE 1 activates a corresponding UL SPS configuration by using the SPS activation message sent by the UE 1, and the activation message is further used to indicate a UL SPS transmission resource for the activated UL SPS configuration. The UE 1 further establishes a correspondence between a specified UL logical channel, and the activated UL SPS configuration and the corresponding UL SPS transmission resource.

Step S505: For an activated UL SPS configuration, the UE 1 transmits, on a corresponding UL SPS resource, data in a UL logical channel having a correspondence with the UL SPS resource.

For steps implemented by using the method in Embodiment 2 of the present invention, refer to Embodiment 4. A difference between the method in Embodiment 5 and that in Embodiment 4 merely lies in that, in Embodiment 4, the UE 1 receives the SPS configuration information sent by the eNB after sending the terminal assistance information to the eNB, and in Embodiment 5, the eNB first sends all possible SPS configuration information to the UE 1, and then the UE 1 sends the terminal assistance information to the eNB to request the eNB to activate one or more SPS configurations specified by the UE 1.

Figure 8:
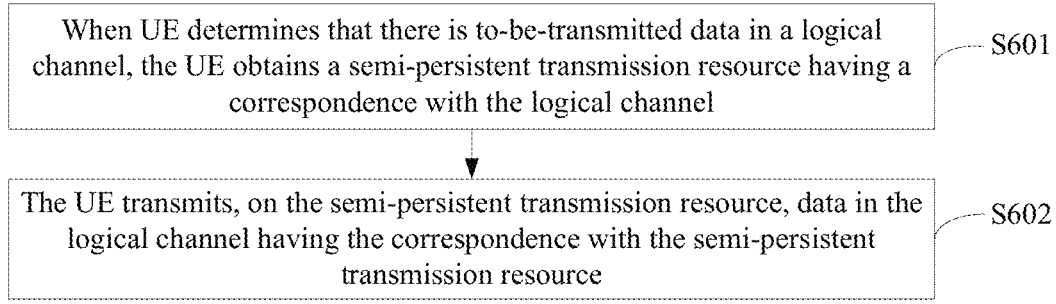
FIG. 8 is a flowchart of another semi-persistent transmission method according to an embodiment of the present invention.

FIG. 8 is a flowchart of another semi-persistent transmission method according to an embodiment of the present invention. The processing steps include:

Step S601: When UE determines that there is to-be-transmitted data in a logical channel, the UE obtains a semi-persistent transmission resource having a correspondence with the logical channel.

Step S602: The UE transmits, on the semi-persistent transmission resource, data in the logical channel having the correspondence with the semi-persistent transmission resource.

Optionally, that the UE transmits data in the logical channel having the correspondence with the semi-persistent transmission resource includes:

the UE preferentially allocates a semi-persistent transmission resource to the to-be-transmitted data in the logical channel corresponding to the semi-persistent transmission resource, until allocation of the semi-persistent transmission resource is complete.

Optionally, that the UE transmits data in the logical channel having the correspondence with the semi-persistent transmission resource includes:

the UE preferentially allocates a semi-persistent transmission resource to all to-be-transmitted data in the logical channel corresponding to the semi-persistent transmission resource, until transmission resources sufficient for transmitting all the to-be-transmitted data are allocated to all the to-be-transmitted data in the corresponding logical channel.

Optionally, when the semi-persistent transmission resource having the correspondence with the logical channel in which the to-be-transmitted data is located further includes an unoccupied idle resource, data in a logical channel having no correspondence with the semi-persistent transmission resource is transmitted on the idle resource.

Figure 9:
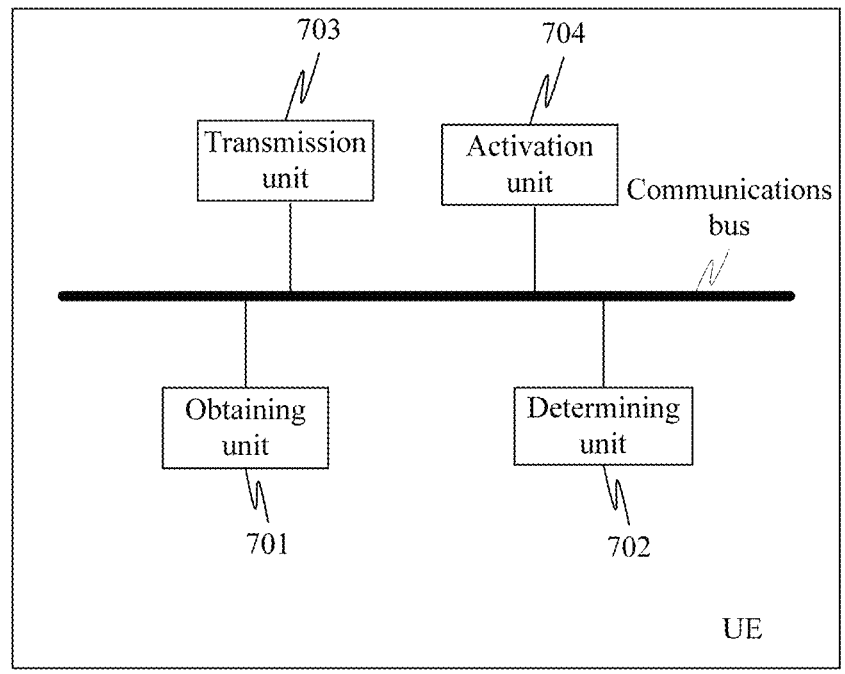
FIG. 9 is a schematic structural diagram of UE according to an embodiment of the present invention.

FIG. 9 is a schematic structural diagram of UE according to an embodiment of the present invention. The UE shown in FIG. 9 corresponds to the UE 1 in the method Embodiments 1, 2, and 3, and includes:

an obtaining unit 701, configured to obtain a semi-persistent transmission resource;

a determining unit 702, configured to determine a logical channel having a correspondence with the semi-persistent transmission resource; and a transmission unit 703, configured to transmit, on the semi-persistent transmission resource, data in the logical channel having the correspondence with the semi-persistent transmission resource.

Optionally, the transmission unit 703 is further configured to:

receive semi-persistent resource configuration information from a network device.

Optionally, the transmission unit 703 is further configured to:

receive semi-persistent resource configuration information corresponding to the semi-persistent transmission resource from a network device.

Optionally, the transmission unit 703 is further configured to:

send a terminal capability report to the network device, where the terminal capability report carries indication information indicating whether the UE supports a plurality of parallel semi-persistent scheduling configurations.

Optionally, the transmission unit 703 is further configured to:

send terminal assistance information to the network device, where the terminal assistance information includes service characteristic information of at least one logical channel.

Optionally, the transmission unit 703 is further configured to receive an activation message from the network device, and the activation message indicates the semi-persistent transmission resource; and the determining unit 702 is further configured to determine the semi-persistent transmission resource based on the activation message.

Optionally, the apparatus further includes:

an activation unit 704, configured to activate a semi-persistent resource configuration based on the activation message, where the semi-persistent resource configuration is determined based on the semi-persistent resource configuration information.

Optionally, the semi-persistent resource configuration activated by the activation unit 704 based on the activation message corresponds to the semi-persistent transmission resource indicated by the activation message.

Optionally, in a sidelink communication scenario, the indication information is used to indicate that the UE supports a plurality of sidelink-based semi-persistent scheduling configurations.

Optionally, in a sidelink communication scenario, the service characteristic information is used to indicate a service characteristic of a sidelink-based logical channel.

Optionally, the service characteristic information includes one parameter or a combination of a plurality of parameters of the following: a logical channel identifier LCID, a layer 2 target address, a data packet arrival period, a data packet arrival moment, a data packet size, and a data packet priority.

Optionally, the data packet priority is a ProSe Per-Packet Priority.

Optionally, the semi-persistent resource configuration information includes one parameter or a combination of a plurality of parameters of the following: a semi-persistent configuration identifier, a semi-persistent scheduling interval, a modulation and coding scheme, an LCID, and a layer 2 target address.

Optionally, the activation message further carries one parameter or a combination of a plurality of parameters of the following: the semi-persistent configuration identifier, the LCID, the layer 2 target address, and a semi-persistent scheduling type indicator.

Optionally, the activation unit 704 is specifically configured to:

activate, based on the semi-persistent configuration identifier in the activation message, a semi-persistent resource configuration corresponding to semi-persistent resource configuration information that includes a same semi-persistent configuration identifier.

Optionally, the determining unit 702 is further configured to:

determine a correspondence between the semi-persistent transmission resource indicated by the activation message and a logical channel determined by the LCID and the layer 2 target address in the activation message; or determine a correspondence between a logical channel determined by the LCID and the layer 2 target address in the activation message, and an activated semi-persistent resource configuration and the semi-persistent transmission resource indicated by the activation message; or determine a correspondence between an activated semi-persistent resource configuration and a logical channel determined by the LCID and the layer 2 target address in the activation message.

Optionally, in an uplink communication scenario, the indication information is used to indicate that the UE supports a plurality of uplink-based semi-persistent scheduling configurations.

Optionally, in an uplink communication scenario, the service characteristic information is used to indicate a service characteristic of an uplink-based logical channel.

Optionally, the service characteristic information includes one parameter or a combination of a plurality of parameters of the following: an LCID, a data packet arrival period, a data packet arrival moment, and a data packet size.

Optionally, the semi-persistent resource configuration information includes one parameter or a combination of a plurality of parameters of the following: a semi-persistent configuration identifier, a semi-persistent scheduling interval, and an LCID.

Optionally, the activation message further carries one parameter or a combination of a plurality of parameters of the following: the semi-persistent configuration identifier, the LCID, and a semi-persistent scheduling type indicator.

Optionally, the activation unit 704 is specifically configured to:

activate, based on the semi-persistent configuration identifier in the activation message, a semi-persistent resource configuration corresponding to semi-persistent resource configuration information that includes a same semi-persistent configuration identifier.

Optionally, the determining unit 702 is further configured to:

determine a correspondence between the semi-persistent transmission resource indicated by the activation message and a logical channel determined by the LCID in the activation message; or determine a correspondence between a logical channel determined by the LCID in the activation message, and an activated semi-persistent resource configuration and the semi-persistent transmission resource indicated by the activation message; or determine a correspondence between an activated semi-persistent resource configuration and a logical channel determined by the LCID in the activation message.

Optionally, the transmission unit 703 is specifically configured to:

perform data transmission based on the activated semi-persistent resource configuration on a semi-persistent transmission resource corresponding to the activated semi-persistent resource configuration.

Optionally, the obtaining unit 701 is specifically configured to:

select, from a preset transmission resource pool, the semi-persistent transmission resource used for corresponding to the logical channel.

Optionally, the determining unit 702 is specifically configured to:

determine the logical channel used for corresponding to the selected semi-persistent transmission resource.

Optionally, the determining unit 702 is further configured to:

determine, based on service characteristic information of the logical channel, semi-persistent resource configuration information corresponding to the semi-persistent transmission resource.

Optionally, the semi-persistent resource configuration information includes one parameter or a combination of a plurality of parameters of the following: a semi-persistent scheduling interval, a modulation and coding scheme, an LCID, and a layer 2 target address.

In another embodiment of the present invention, in hardware implementation, the transmission unit 703 may implement information sending and receiving functions by using a transceiver integrated with functions of a transmitter and a receiver, or may separately implement an information receiving function by using an independent receiver and implement an information sending function by using an independent transmitter. The determining unit 702 and the activation unit 704 may be combined into one function module that is built in or independent of a processor of the UE 1 in a form of hardware, or may be stored in a memory of the UE 1 in a form of software, so that the processor performs invoking to execute operations corresponding to the foregoing units. When the UE obtains the semi-persistent transmission resource from the network device, the obtaining unit 701 and the transmission unit 703 may be combined into one function module. When the UE determines the semi-persistent transmission resource, the obtaining unit 701 is combined into a module in which the determining unit 702 and the activation unit 704 are located.

Figure 10:
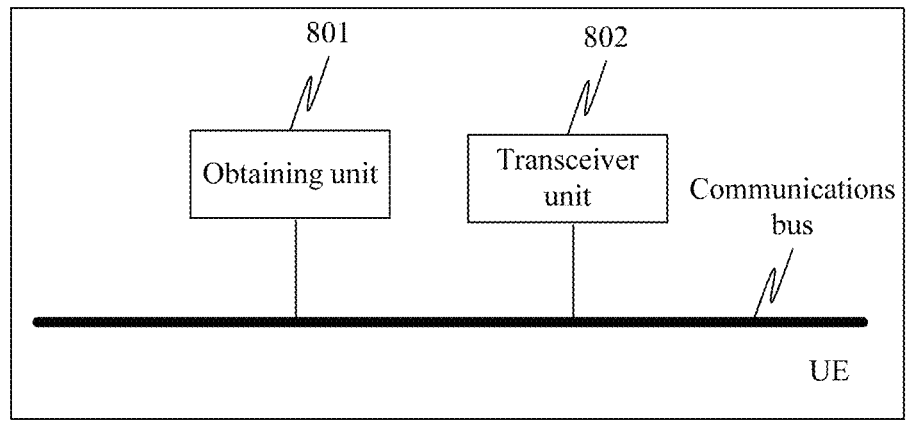
FIG. 10 is another schematic structural diagram of UE according to an embodiment of the present invention.

FIG. 10 is another schematic structural diagram of UE according to an embodiment of the present invention. The UE shown in FIG. 10 corresponds to the UE 1 in the foregoing method embodiment 4, and includes:

an obtaining unit 801, configured to: when it is determined that there is to-be-transmitted data in a logical channel, obtain a semi-persistent transmission resource having a correspondence with the logical channel; and a transceiver unit 802, configured to transmit, on the semi-persistent transmission resource, data in the logical channel having the correspondence with the semi-persistent transmission resource.

Optionally, the transceiver unit 802 is specifically configured to:

preferentially allocate a semi-persistent transmission resource to the to-be-transmitted data in the logical channel corresponding to the semi-persistent transmission resource, until allocation of the semi-persistent transmission resource is complete.

Optionally, the transceiver unit 802 is specifically configured to:

preferentially allocate a semi-persistent transmission resource to all to-be-transmitted data in the logical channel corresponding to the semi-persistent transmission resource, until transmission resources sufficient for transmitting all the to-be-transmitted data are allocated to all the to-be-transmitted data in the corresponding logical channel.

Optionally, the transceiver unit 802 is further configured to:

when the semi-persistent transmission resource having the correspondence with the logical channel in which the to-be-transmitted data is located further includes an unoccupied idle resource, transmit, on the idle resource, data in a logical channel having no correspondence with the semi-persistent transmission resource.

In another embodiment of the present invention, in hardware implementation, the transmission unit may implement information sending and receiving functions by using a transceiver integrated with functions of a transmitter and a receiver, or may separately implement an information receiving function by using an independent receiver and implement an information sending function by using an independent transmitter. The obtaining unit 801 is a function module built in or independent of a processor of the UE in a form of hardware, or may be stored in a memory of the UE in a form of software, so that the processor performs invoking to execute operations corresponding to the foregoing units.

Figure 11:
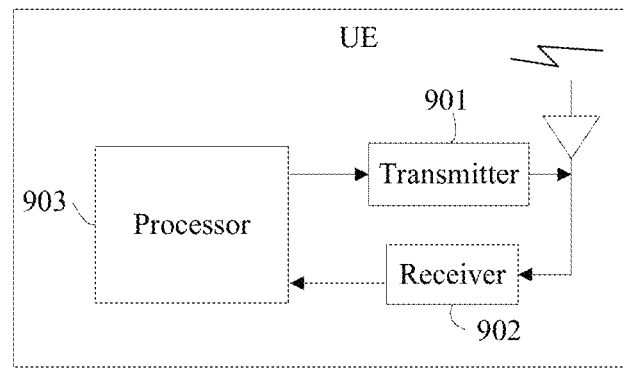
FIG. 11 is still another schematic structural diagram of UE according to an embodiment of the present invention.

FIG. 11 is still another schematic structural diagram of UE according to an embodiment of the present invention. The UE includes a transmitter 901, a receiver 902, and a processor 903.

The transmitter 901 adjusts (for example, performs analog conversion, filtering, amplification, and up-conversion on) an output sample and generates an uplink signal, and the uplink signal is transmitted to the base station in the foregoing embodiments by using an antenna. On a downlink, an antenna receives a downlink signal transmitted by the base station in the foregoing embodiments. The receiver 902 adjusts (for example, performs filtering, amplification, down-conversion, and digitalization on) a signal received from the antenna, and provides an input sample. These units perform processing based on radio access technologies (for example, access technologies of an LTE system and another evolved system) used by a radio access network.

The processor 903 performs control and management on an action of the UE, and is configured to perform the processing performed by the UE in the foregoing Embodiments 1 to 4.

Figure 12:
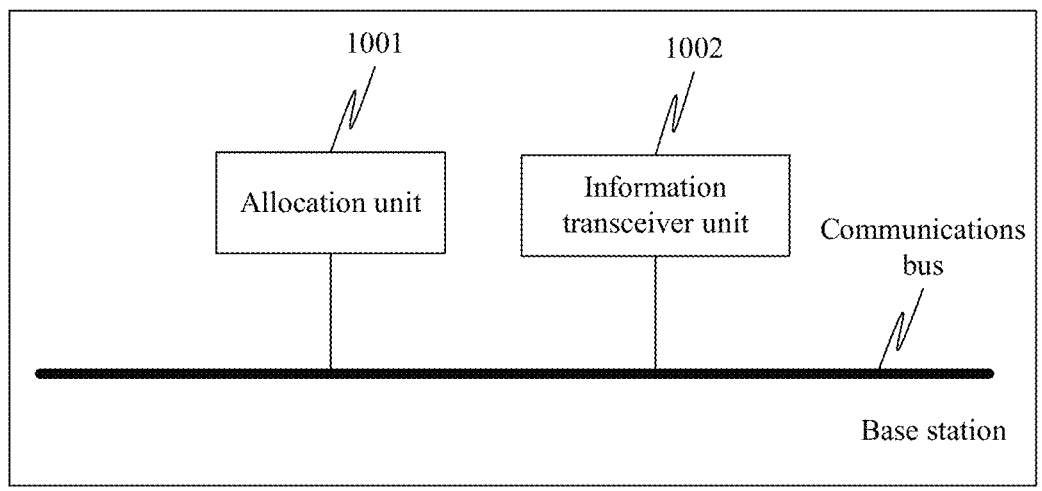
FIG. 12 is a schematic structural diagram of a base station according to an embodiment of the present invention.

FIG. 12 is a schematic structural diagram of a base station according to an embodiment of the present invention. The base station shown in FIG. 12 corresponds to a network device in the method embodiment, for example, an eNB, and includes: an allocation unit 1001, configured to allocate a semi-persistent transmission resource to UE, and determine a logical channel having a correspondence with the semi-persistent transmission resource; and an information transceiver unit 1002, configured to send, to the UE, information about the semi-persistent transmission resource allocated to the UE and information about the logical channel having the correspondence with the semi-persistent transmission resource.

Optionally, the information transceiver unit 1002 is further configured to:

receive a terminal capability report from the UE, where the terminal capability report carries indication information indicating whether the UE supports a plurality of parallel semi-persistent scheduling configurations.

Optionally, the information transceiver unit 1002 is further configured to: receive terminal assistance information from the UE, where the terminal assistance information includes service characteristic information of at least one logical channel; and the allocation unit 1001 is specifically configured to allocate the semi-persistent transmission resource to the UE based on the service characteristic information of the logical channel.

Optionally, the information transceiver unit 1002 is specifically configured to:

send semi-persistent resource configuration information corresponding to the semi-persistent transmission resource to the UE.

Optionally, the information transceiver unit 1002 is further configured to:

send an activation message to the UE, where the activation message indicates the semi-persistent transmission resource allocated to the UE.

Optionally, in a sidelink communication scenario, the indication information is used to indicate that the UE supports a plurality of sidelink-based semi-persistent scheduling configurations.

Optionally, in a sidelink communication scenario, the service characteristic information is used to indicate a service characteristic of a sidelink-based logical channel.

Optionally, the service characteristic information includes one parameter or a combination of a plurality of parameters of the following: a logical channel identifier LCID, a layer 2 target address, a data packet arrival period, a data packet arrival moment, a data packet size, and a data packet priority.

Optionally, the data packet priority is a ProSe Per-Packet Priority.

Optionally, the semi-persistent resource configuration information includes one parameter or a combination of a plurality of parameters of the following: a semi-persistent configuration identifier, a semi-persistent scheduling interval, a modulation and coding scheme, an LCID, and a layer 2 target address.

Optionally, the activation message further carries one parameter or a combination of a plurality of parameters of the following: the semi-persistent configuration identifier, the LCID, the layer 2 target address, and a semi-persistent scheduling type indicator.

Optionally, in an uplink communication scenario, the indication information is used to indicate that the UE supports a plurality of uplink-based semi-persistent scheduling configurations.

Optionally, in an uplink communication scenario, the service characteristic information is used to indicate a service characteristic of an uplink-based logical channel.

Optionally, the service characteristic information includes one parameter or a combination of a plurality of parameters of the following: an LCID, a data packet arrival period, a data packet arrival moment, and a data packet size.

Optionally, the semi-persistent resource configuration information includes one parameter or a combination of a plurality of parameters of the following: a semi-persistent configuration identifier, a semi-persistent scheduling interval, and an LCID.

Optionally, the activation message further carries one parameter or a combination of a plurality of parameters of the following: a semi-persistent configuration identifier, an LCID, and a semi-persistent scheduling type indicator.

In another embodiment of the present invention, in hardware implementation, the information transceiver unit 1002 may implement information sending and receiving functions by using a transceiver integrated with functions of a transmitter and a receiver, or may separately implement an information receiving function by using an independent receiver and implement an information sending function by using an independent transmitter. The allocation unit 1001 may be built in or independent of a processor of the UE in a form of hardware, or may be stored in a memory of the UE in a form of software, so that the processor performs invoking to execute operations corresponding to the foregoing units.

As shown in any one of FIG. 9, FIG. 10, and FIG. 12, the units in the UE or the base station may be connected to each other by using a communications bus. It is not shown in the figure that the units in the foregoing devices may alternatively be connected by using another connection manner. This is not limited in this embodiment of the present invention.

Figure 13:
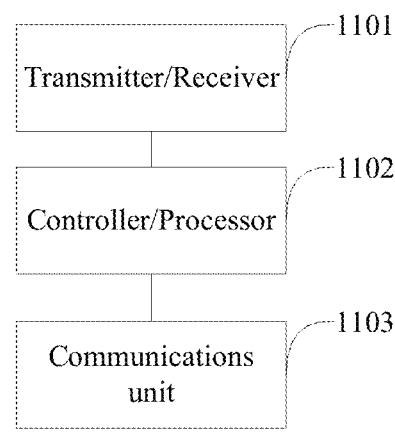
FIG. 13 is another schematic structural diagram of a base station according to an embodiment of the present invention.

FIG. 13 is another schematic structural diagram of a base station according to an embodiment of the present invention. The base station includes a transmitter/receiver 1101, a controller/processor 1102, and a communications unit 1103. The transmitter/receiver 1101 is configured to support information sending and receiving between the base station and the UE in the foregoing embodiments, and support wireless communication between the UE and another UE. The controller/processor 1102 performs various functions used for communication with the UE. On an uplink, an uplink signal from the UE is received by using an antenna and demodulated by the receiver 1101, and further, the controller/processor 1112 performs processing to restore service data and signaling information that are sent by the UE. On a downlink, the controller/processor 1102 processes service data and a signaling message, the transmitter 1101 performs demodulation to generate a downlink signal, and the downlink signal is transmitted to the UE by using an antenna. The controller/processor 1102 further performs processing processes related to the base station in Embodiments 1 to 5, and/or is configured to perform other processes of technologies described in this application. The communications unit 1103 is configured to support communication between the base station and another network entity, for example, configured to support communication between the base station and the UE or entities such as an MME, an SGW, and/or a PGW that are located in a core network EPC.

It may be understood that, FIG. 13 merely shows a simplified design of the base station. In actual application, the base station may include any quantity of transmitters, receivers, processors, controllers, memories, communications units, or the like. All base stations that can implement the present invention fall within the protection scope of the present invention.

The processor configured to perform functions of the foregoing base station and UE in the present invention may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits that are described with reference to the content disclosed in the present invention. The processor may also be a combination of computing functions, for example, a combination of one or more microprocessors or a combination of a DSP and a microprocessor.

The methods or algorithm steps described with reference to the content disclosed in the present invention may be implemented in a hardware manner, or may be implemented in a manner of executing a software instruction by a processor. The software instruction may include a corresponding software module. The software module may be stored in a RAM memory, a flash memory, a ROM memory, an EPROM memory, an EEPROM memory, a register, a hard disk, a removable hard disk, a CD-ROM, or a storage medium in any other forms well-known in the art. A storage medium used as an example is coupled to the processor, so that the processor can read information from the storage medium, and can write information into the storage medium. Certainly, the storage medium may be a part of the processor. The processor and the storage medium may be located in an ASIC. In addition, the ASIC may be located in user equipment. Certainly, the processor and the storage medium may exist in the user equipment as discrete components.

A person skilled in the art should be aware that in one or more of the foregoing examples, the functions described in the present invention may be implemented by using hardware, software, firmware, or any combination thereof. When this application is implemented by using software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general or dedicated computer.

The objectives, technical solutions, and benefit effects of the present invention are further described in detail in the foregoing specific embodiments. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A method of semi-persistent transmission, comprising:
    sending, by a user equipment (UE) to a network device, a terminal capability report including indication information indicating whether the UE supports a plurality of sidelink-based parallel semi-persistent scheduling configurations,
    wherein, in response to the terminal capability report indicating the UE supports a mechanism of the plurality of sidelink-based parallel semi-persistent scheduling configurations, the UE and the network device perform the following:
        sending, by the UE to the network device, terminal assistance information, wherein the terminal assistance information includes service characterization information of at least one logical channel, and wherein the service characteristic information of each of the at least one logical channel includes a combination of a plurality of parameters including a logical channel identifier, a layer 2 target address, a data packet arrival period, a data packet arrival moment, a data packet size, and a data packet priority, and wherein the data packet priority is a ProSe Per-Packet Priority;
        sending, by the network device to the UE, semi-persistent scheduling configuration information;
        sending, by the network device to the UE, a semi-persistent scheduling activation message;
        determining, by the UE, a semi-persistent transmission resource based on the semi-persistent scheduling configuration information and the semi-persistent scheduling activation message;
        determining, by the UE, the at least one logical channel having a correspondence with the semi-persistent transmission resource; and
        transmitting, by the UE on the semi-persistent transmission resource, data in the at least one logical channel having the correspondence with the semi-persistent transmission resource.

2. The method according to claim 1, wherein the method further comprises:
    receiving, by the UE, the semi-persistent resource configuration information from the network device.

3. The method according to claim 1, wherein the method further comprises:
    receiving, by the UE, the semi-persistent resource configuration information corresponding to the semi-persistent transmission resource from the network device.

4. The method according to claim 1, wherein the semi-persistent transmission resource is bound to the at least one logical channel.

5. A method of semi-persistent transmission, comprising:
    receiving, by a network device from a user equipment (UE), a terminal capability report including indication information indicating whether the UE supports a plurality of sidelink-based parallel semi-persistent scheduling configurations,
    wherein, in response to the terminal capability report indicating the UE supports a mechanism of the plurality of sidelink-based parallel semi-persistent scheduling configurations, the UE and the network device perform the following:
        receiving, by the network device from the UE, terminal assistance information, wherein the terminal assistance information includes service characterization information of at least one logical channel, and wherein the service characteristic information of each of the at least one logical channel includes a combination of a plurality of parameters including a logical channel identifier, a layer 2 target address, a data packet arrival period, a data packet arrival moment, a data packet size, and a data packet priority, and wherein the data packet priority is a ProSe Per-Packet Priority;

sending, by the network device to the UE, semi-persistent scheduling configuration information;

sending, by the network device to the UE, a semi-persistent scheduling activation message; and allocating, by the network device to the UE, a semi-persistent transmission resource associated with the semi-persistent scheduling configuration information and the semi-persistent scheduling activation message, wherein the UE determines the at least one logical channel having a correspondence with the semi-persistent transmission resource; and sending, by the network device to the UE, information about the semi-persistent transmission resource allocated to the UE and information about the at least one logical channel having the correspondence with the semi-persistent transmission resource.

6. The method according to claim 5, wherein the allocating, by a network device, the semi-persistent transmission resource to UE comprises:

allocating, by the network device to the UE, the semi-persistent transmission resource based on the service characteristic information of the at least one logical channel.

7. The method according to claim 5, wherein the sending, by the network device to the UE, information about the semi-persistent transmission resource allocated to the UE and information about the at least one logical channel having the correspondence with the semi-persistent transmission resource comprises:

sending, by the network device to the UE, the semi-persistent resource configuration information corresponding to the semi-persistent transmission resource.

8. The method according to claim 7, wherein after the sending, by the network device to the UE, the semi-persistent resource configuration information, the method further comprises:

sending, by the network device to the UE, the semi-persistent scheduling activation message to indicate the semi-persistent transmission resource allocated to the UE.

9. A semi-persistent transmission apparatus implemented with a user equipment (UE), comprising:

a memory to store instructions; and a processor to execute the instructions to configure the semi-persistent transmission apparatus to:

send to a network device a terminal capability report including indication information indicating whether the UE supports a plurality of sidelink-based parallel semi-persistent scheduling configurations, wherein in response to the terminal capability report indicating the UE supports a mechanism of the plurality of sidelink-based parallel semi-persistent scheduling configurations, the UE and the network device perform the following:

the UE sends terminal assistance information to the network device, wherein the terminal assistance information includes service characterization information of at least one logical channel, and wherein the service characteristic information of each of the at least one logical channel includes a combination of a plurality of parameters including a logical channel identifier, a layer 2 target address, a data packet arrival period, a data packet arrival moment, a data packet size, and a data packet priority, and wherein the data packet priority is a ProSe Per-Packet Priority;

the network device sends semi-persistent scheduling configuration information to the UE;

the network device sends a semi-persistent scheduling activation message to the UE; and the UE determines a semi-persistent transmission resource based on the semi-persistent scheduling configuration information and the semi-persistent scheduling activation message;

the UE determines the at least one logical channel having a correspondence with the semi-persistent transmission resource;

the UE transmits, on the semi-persistent transmission resource, data in the at least one logical channel having the correspondence with the semi-persistent transmission resource.

10. The apparatus according to claim 9, wherein the processor further configures the semi-persistent apparatus to:

receive the semi-persistent resource configuration information from the network device.

11. The apparatus according to claim 9, wherein the processor further configures the semi-persistent apparatus to:

receive from the network device the semi-persistent resource configuration information corresponding to the semi-persistent transmission resource.

* * * * *

UNITED STATES PATENT AND TRADEMARK OFFICE
CERTIFICATE OF CORRECTION

| | |
|---|---|
| PATENT NO. | : 10,973,045 B2 |
| APPLICATION NO. | : 16/273670 |
| DATED | : April 6, 2021 |
| INVENTOR(S) | : Xiao et al. |

It is certified that error appears in the above-identified patent and that said Letters Patent is hereby corrected as shown below:

On the Title Page

Item (54) and in the Specification, Column 1, Lines 1-3: "SEMI-PERSISTENT TRANSMISSION METHOD AND APPARATUS IN VIX COMMUNICATION" should read -- SEMI-PERSISTENT TRANSMISSION METHOD AND APPARATUS IN VTX COMMUNICATION --.

Signed and Sealed this
Twenty-sixth Day of April, 2022

Katherine Kelly Vidal
*Director of the United States Patent and Trademark Office*